(12) United States Patent
den Doelder et al.

(10) Patent No.: US 10,358,543 B2
(45) Date of Patent: Jul. 23, 2019

(54) COMPOSITIONS CONTAINING LOW DENSITY ETHYLENE-BASED POLYMERS WITH HIGH MELT STRENGTH AND FILMS FORMED FROM THE SAME

(71) Applicant: Dow Global Technologies LLC, Midland, MI (US)

(72) Inventors: Cornelis F. J. den Doelder, Terneuzen (NL); Teresa P. Karjala, Lake Jackson, TX (US); Otto J. Berbee, Hulst (NL); Lori L. Kardos, Sugar Land, TX (US)

(73) Assignee: Dow Global Technologies LLC, Midland, MI (US)

( * ) Notice: Subject to any disclaimer, the term of this patent is extended or adjusted under 35 U.S.C. 154(b) by 571 days.

(21) Appl. No.: 14/889,160

(22) PCT Filed: May 21, 2014

(86) PCT No.: PCT/US2014/038939
§ 371 (c)(1),
(2) Date: Nov. 5, 2015

(87) PCT Pub. No.: WO2014/190036
PCT Pub. Date: Nov. 27, 2014

(65) Prior Publication Data
US 2016/0137822 A1 May 19, 2016

Related U.S. Application Data

(60) Provisional application No. 61/826,263, filed on May 22, 2013.

(51) Int. Cl.
| | | |
|---|---|---|
| *C08L 23/06* | (2006.01) | |
| *C08L 23/08* | (2006.01) | |
| *B32B 27/08* | (2006.01) | |
| *B32B 27/32* | (2006.01) | |

(52) U.S. Cl.
CPC .............. *C08L 23/06* (2013.01); *B32B 27/08* (2013.01); *B32B 27/32* (2013.01); *C08L 23/0815* (2013.01); *B32B 2250/02* (2013.01); *B32B 2250/246* (2013.01); *C08L 2203/16* (2013.01); *C08L 2207/066* (2013.01)

(58) Field of Classification Search
None
See application file for complete search history.

(56) References Cited

U.S. PATENT DOCUMENTS

| | | |
|---|---|---|
| 4,511,609 A | 4/1985 | Craver et al. |
| 4,705,829 A | 11/1987 | Kwack et al. |
| 5,741,861 A | 4/1998 | Yamamoto et al. |
| 7,741,415 B2 | 6/2010 | Conrad et al. |
| 7,820,776 B2 | 10/2010 | Neuteboom et al. |
| 8,415,442 B2 | 4/2013 | Karjala et al. |
| 8,871,876 B2 | 10/2014 | Berbee et al. |
| 8,916,667 B2 | 12/2014 | Karjala et al. |
| 9,120,880 B2 | 9/2015 | Zschoch et al. |
| 9,228,036 B2 | 1/2016 | Berbee et al. |
| 2003/0065097 A1* | 4/2003 | DeGroot ................. C08F 10/00 525/240 |
| 2008/0038533 A1 | 2/2008 | Best et al. |
| 2008/0125547 A1* | 5/2008 | Swogger ................. C08L 23/04 525/185 |
| 2008/0125553 A1 | 5/2008 | Conrad et al. |
| 2014/0316096 A1 | 10/2014 | Berbee et al. |
| 2015/0274856 A1 | 10/2015 | Berbee et al. |

FOREIGN PATENT DOCUMENTS

| | | |
|---|---|---|
| EP | 0792318 A1 | 9/1997 |
| EP | 2239283 A1 | 10/2010 |
| JP | 61241339 A | 10/1986 |
| JP | 2005232227 A | 9/2005 |
| WO | 2006/049783 A1 | 5/2006 |
| WO | 2009/114661 A1 | 9/2009 |
| WO | 2010/144784 A1 | 12/2010 |
| WO | 2011019563 A1 | 2/2011 |
| WO | 2012/082393 A1 | 6/2012 |
| WO | 2013/133956 A2 | 9/2013 |
| WO | 2014/070385 A1 | 5/2014 |
| WO | 2014/179469 A2 | 11/2014 |
| WO | 2014/190039 A1 | 11/2014 |
| WO | 2014/190041 A1 | 11/2014 |
| WO | 2015/094566 A1 | 6/2015 |

OTHER PUBLICATIONS

PCT/US2014/038939, Aug. 25, 2014, International Search Report and Written Opinion.
PCT/US2014/038939, Dec. 3, 2015, International Preliminary Report on Patentability.

* cited by examiner

Primary Examiner — Robert T Butcher (57) ABSTRACT

The invention provides a composition comprising the following: A) a first ethylene-based polymer, formed by a high pressure, free-radical polymerization process, and comprising the following properties: a) a Mw(abs) versus I2 relationship: Mw(abs)<A×[(I2)$^B$], where A=5.00×10$^2$ (kg/mole)/(dg/min)$^B$, and B=−0.40; and b) a MS versus I2 relationship: MS≥C×[(I2)$^D$], where C=13.5 cN/(dg/min)$^D$, and D=−0.55, c) a melt index (I2) from greater than 0.9 to 2.5 g/10 min; and B) a second ethylene-based polymer; and wherein the second ethylene-based polymer has a melt index (I2) from 0.1 to 4.0 g/10 min.

14 Claims, 3 Drawing Sheets

COMPOSITIONS CONTAINING LOW DENSITY ETHYLENE-BASED POLYMERS WITH HIGH MELT STRENGTH AND FILMS FORMED FROM THE SAME

REFERENCE TO RELATED APPLICATIONS

This application claims the benefit of U.S. Provisional Application 61/826,263, filed on May 22, 2013.

BACKGROUND

Blown film production lines are typically limited in output by bubble stability. Blending Linear Low Density Polyethylene (LLDPE) with Low Density Polyethylene (LDPE) increases bubble stability, in part due to the higher melt strength of the LDPE. The increase in melt strength in part provides for an increase in film output. However, too high a melt strength can cause gels and poor quality film, as well as potentially limiting drawdown capabilities to thinner gauges. High melt strength resins also typically have reduced optics. Thus, there is a need for new compositions containing ethylene-based polymers, such as tubular LDPEs, that have an optimized balance of melt strength, optical and mechanical properties, for blown film applications.

The performance and application of films made from LLDPE-rich blends with LDPE will be strongly influenced by the rheology, density, and crystallinity of the selected LLDPE. The density and the crystallinity of the LLDPE can be varied over a wide range. The performance and application of films made from LDPE-rich blends with LLDPE will be increasingly influenced by the rheology and the molecular topology of the selected LDPE.

The processability of the blend will, to a large extent, be determined by the rheological properties of the LDPE blend components. In contrast to LLDPE, the density and crystallinity levels of the LDPE resin can only be varied in narrow ranges. Furthermore, these narrow ranges are to a large extent determined by the synthesis conditions needed to reach the desired molecular weight distribution (MWD) and the required rheological performance of the LDPE. For blends rich in LDPE, the density and the crystallinity level can be marginally influenced by the type of LLDPE and/or the allowed level of LLDPE. The level of LLDPE allowed will depend on the processing performance required, for instance bubble stability and bubble size Improved rheological properties of the LDPE blend component will lower the percentage of LDPE needed in the blend to reach a certain processing level. Furthermore, a lower percentage of LDPE means that the contribution to the film performance of the LLDPE blend component can be strengthened.

Improved rheological performance can be obtained by selecting LDPE resins with broad MWD and high melt strengths. Typically LDPE resins with very broad MWD are made using autoclave based reactor systems. The inherent residence time distribution in autoclave based reactor systems leads to broad MWD due to differentiated (time) growth paths of the polymer molecules. The high melt strength of the autoclave blend components is achieved by extremely broad, and, in some cases, bimodal MWD. The ultra high molecular weight fraction present in autoclave, high melt strength resins complicates blending at the molecular scale, could give rise to gel formation in the resultant films, while it negatively affects the optical performance of the films.

A tubular reactor operated under typical process conditions, operates at higher conversion levels and lower production costs, produces "less broad MWD" resins than typical broad MWD resins from an autoclave train, such as those used for extrusion coating or in blends. As a result, more of the "less broad MWD" tubular resin has to be blended into the LLDPE to reach a certain processing performance of the LDPE/LLDPE blends, or a lower melt index target has to be selected for the LDPE. The lower MI target will negatively affect the processability, such as increased processing pressures.

Thus, there remains a need for new LDPE-containing compositions, which can increase the melt strength and the processing performance of LDPE/LLDPE blends, and which can be made at low conversion costs in a tubular process. Furthermore, there is need for such compositions with improved performance in processing (maximum line speed and or large bubble operation) and/or film properties (mechanical and shrink performance and/or optical appearance). This requires LDPE resins made at lower melt index, high melt strength, and very broad MWD, but lacking the ultra high molecular weight fraction of "broad MWD" autoclave resins, and which can be made in a tubular process.

The uniform residence time in tubular reactors leads to narrower MWD, therefore very broad MWD can only be achieved in tubular reactors by applying extremely differentiated polymerization conditions, for example, as described in International Publication WO2013/078018, and/or application of a branching/cross-linking agent, for example, as described in U.S. Pat. No. 7,820,776. These tubular polyethylenes will have a specific composition (e.g. density) and functionality as determined by the applied process conditions, type and level of branching agent and/or comonomer. Undesirable gels in the polymer can be an issue, resulting from the use of branching or cross-linking agents.

Low density polyethylenes and blends are disclosed in the following: U.S. Publication 2014/0094583; U.S. Pat. Nos. 5,741,861; 7,741,415; 4,511,609; 4,705,829; U.S. Publication No. 2008/0038533; JP61-241339 (Abstract); JP2005-232227 (Abstract); and International Publication Nos. WO2010/144784, WO2011/019563, WO 2010/042390, WO 2010/144784, WO 2012/082393, WO 2006/049783, WO 2009/114661, U.S. 2008/0125553, EP0792318A1 and EP 2239283B1. However, such polymers do not provide an optimized balance of high melt strength and improved film mechanical properties, for blown film applications. Thus, as discussed above, there remains a need for new ethylene-based polymer compositions that have an optimized balance of melt strength, optics, processability and output, and toughness. These needs and others have been met by the following invention.

SUMMARY OF INVENTION

The invention provides a composition comprising the following:
A) a first ethylene-based polymer, formed by a high pressure, free-radical polymerization process, and comprising the following properties:
   a) a Mw(abs) versus I2 relationship: $Mw(abs) < A \times [(I2)^B]$, where $A = 5.00 \times 10^2$ (kg/mole)/(dg/min)$^B$, and $B = -0.40$, and
   b) a MS versus I2 relationship: $MS \geq C \times [(I2)^D]$, where $C = 13.5$ cN/(dg/min)$^D$, and $D = -0.55$,
   c) a melt index (I2) from greater than 0.9 to 2.5 g/10 min; and
B) a second ethylene-based polymer; and
   wherein the second ethylene-based polymer has a melt index (I2) from 0.1 to 4.0 g/10 min.

DETAILED DESCRIPTION

As discussed above, the invention provides a composition comprising the following:

A) a first ethylene-based polymer, formed by a high pressure, free-radical polymerization process, and comprising the following properties:
  a) a Mw(abs) versus I2 relationship: $Mw(abs) < A \times [(I2)^B]$, where $A = 5.00 \times 10^2$ (kg/mole)/(dg/min)$^B$, and $B = -0.40$, and
  b) a MS versus I2 relationship: $MS \geq C \times [(I2)^D]$, where $C = 13.5$ cN/(dg/min)$^D$, and $D = -0.55$,
  c) a melt index (I2) from greater than 0.9 to 2.5 g/10 min; and
B) a second ethylene-based polymer; and
  wherein the second ethylene-based polymer has a melt index (I2) from 0.1 to 4.0 g/10 min.

The composition may comprise a combination of two or more embodiments described herein.

The first ethylene-based polymer may comprise a combination of two or more embodiments as described herein.

The second ethylene-based polymer may comprise a combination of two or more embodiments as described herein.

In feature a) above, the Mw(abs) is determined by GPC as described herein.

In feature b) above, the Melt Strength (MS) is determined at 190° C.; see test method described herein.

In one embodiment, the second ethylene-based polymer has a melt index (I2) from 0.2 to 3.5 g/10 min, further from 0.3 to 3.0 g/10 min, further from 0.4 to 2.5 g/10 min.

In one embodiment, the second ethylene-based polymer has a density from 0.870 to 0.969 g/cc, further from 0.890 to 0.950 g/cc, further from 0.910 to 0.940 g/cc, further from 0.915 to 0.930 g/cc.

In one embodiment, the second ethylene-based polymer is present in an amount from 5 to 95 weight percent, further from 10 to 95 weight percent, further from 20 to 95 weight percent, further from 30 to 95 weight percent, based on weight of the composition.

In one embodiment, the second ethylene-based polymer is present in an amount from 40 to 95 weight percent, further from 50 to 95 weight percent, further from 60 to 95 weight percent, further from 70 to 95 weight percent, based on weight of the composition.

In one embodiment, the second ethylene-based polymer is an ethylene/α-olefin interpolymer, and further a copolymer. In a further embodiment, the ethylene/α-olefin interpolymer is a heterogeneously branched ethylene/α-olefin interpolymer, and further a copolymer. Suitable alpha-olefins include, but are not limited to, propylene, butene-1, pentene-1,4-methylpentene-1, pentene-1, hexene-1 and octene-1, and preferably propylene, butene-1, hexene-1 and octene-1.

In one embodiment, the second ethylene-based polymer is selected from an ethylene/alpha-olefin copolymer, a low density polyethylene (LDPE), a high density polyethylene (HDPE), or a combination thereof.

The second ethylene-based polymer may comprise a combination of two or more embodiments as described herein.

In one embodiment, the first ethylene-based polymer is present in an amount from "greater than zero" to 30 weight percent, further from 1 to 25 wt %, further from 2 to 20 wt %, based on the sum of the weight of first ethylene-based polymer and the second ethylene-based polymer.

In one embodiment, the first ethylene-based polymer is present in an amount greater than, or equal to, 20 weight percent, further greater than, or equal to, 50 weight percent, based on the sum of the weight of first ethylene-based polymer and the second ethylene-based polymer.

In one embodiment, the first ethylene-based polymer is present in an amount from 1 to 95 weight percent, further from 5 to 95 weight percent, further from 10 to 90 weight percent, based on the sum of the weight of first ethylene-based polymer and the second ethylene-based polymer.

In one embodiment, the first ethylene-based polymer has a melt index (I2) from 0.9 g/10 min to 2.2 g/10 min, further from 0.9 g/10 min to 2.0 g/10 min (ASTM 1238 2.16 kg/190° C.).

In one embodiment, the first ethylene-based polymer has b) a Mw(abs) versus I2 relationship: $Mw(abs) < A \times [(I2)^B]$, where $A = 4.25 \times 10^2$ (kg/mole)/(dg/min)$^B$, and $B = -0.40$ (Mw(abs) by GPC).

In one embodiment, the first ethylene-based polymer has b) a Mw(abs) versus I2 relationship: $Mw(abs) < A \times [(I2)^B]$, where $A = 3.50 \times 10^2$ (kg/mole)/(dg/min)$^B$, and $B = -0.40$ (Mw(abs) by GPC).

In one embodiment, the first ethylene-based polymer has a c) a MS versus I2 relationship: $MS \geq C \times [(I2)^D]$, where $C = 14.5$ cN/(dg/min)$^D$, and $D = -0.55$ (Melt Strength=MS, 190° C.).

In one embodiment, the first ethylene-based polymer has a c) a MS versus I2 relationship: $MS \geq C \times [(I2)^D]$, where $C = 15.5$ cN/(dg/min)$^D$, and $D = -0.55$ (Melt Strength=MS, 190° C.).

In one embodiment, the first ethylene-based polymer has a G' value greater than, or equal to, 140 Pa, at 170° C., further greater than, or equal to, 150 Pa, at 170° C., further greater than, or equal to, 160 Pa, at 170° C.

In one embodiment, the first ethylene-based polymer has a melt strength greater than, or equal to, 9.0 cN, at 190° C., further greater than, or equal to, 12.0 cN, at 190° C., further greater than, or equal to, 15.0 cN, at 190° C.

In one embodiment, the first ethylene-based polymer has a Melt Strength (190° C.) from 10 to 20 cN.

In one embodiment, the first ethylene-based polymer has a "weight fraction (w) of molecular weight greater than $10^6$ g/mole, based on the total weight of polymer, as determined by GPC(abs), that meets the following relationship: $w < E \times [(I2)^F]$, where $E = 0.110$ (dg/min)$^{-F}$, and $F = -0.38$ (GPC).

In one embodiment, the first ethylene-based polymer is polymerized in at least one tubular reactor. In a further embodiment, the first ethylene-based polymer is polymerized in a tubular reactor system that does not comprise an autoclave reactor.

In one embodiment, the first ethylene-based polymer is polymerized in a reactor configuration comprising at least one tubular reactor.

In one embodiment, the first ethylene-based polymer is a LDPE.

In one embodiment, the first ethylene-based polymer is selected from a polyethylene homopolymer or an ethylene-based interpolymer.

In one embodiment, in the first ethylene-based polymer is selected from a polyethylene homopolymer or an ethylene-based copolymer; and wherein the comonomer of the ethylene-based copolymer is selected from a vinyl acetate, an alkyl acrylate, carbon monoxide, an acrylic acid, a carboxylic acid-containing comonomer, an ionomer, a mono olefin, or selected from a vinyl acetate, an alkyl acrylate, acrylic acid, or a mono olefin. In a further embodiment, the comonomer is present in an amount from 0.5 to 30 wt % comonomer, based on weight of copolymer.

In one embodiment, the first ethylene-based polymer has a density from 0.910 to 0.940 g/cc, further from 0.912 to 0.935 g/cc, further from 0.914 to 0.930 g/cc (1 cc=1 cm$^3$).

In one embodiment, the first ethylene-based polymer has a density from 0.910 to 0.930 g/cc, further from 0.912 to 0.925 g/cc, further from 0.914 to 0.920 g/cc (1 cc=1 cm$^3$).

In one embodiment, the first ethylene-based polymer has a density greater than, or equal to, 0.914 g/cc, or greater than, or equal to, 0.916 g/cc.

The first ethylene-based polymer may comprise a combination of two or more embodiments as described herein.

In one embodiment, when an inventive composition is formed into a film, via a blown film process, the maximum output rate is at least 15 percent greater than the maximum output rate of a similar film formed from a similar composition, except the composition contains 100 wt % of the second ethylene-based polymer, based on the sum of the weight of the first ethylene-based polymer and the second ethylene-based polymer.

An inventive composition may comprise a combination of two or more embodiments as described herein.

The invention also provides an article comprising at least one component formed from an inventive composition.

In one embodiment, the article is selected from coatings, films, foams, laminates, fibers, or tapes. In another embodiment, the article is a film.

The invention also provides a film comprising at least one layer formed from an inventive composition.

In one embodiment, the film comprises at least two layers.

In one embodiment, the film has a MD shrink tension greater than 5.00 psi.

An inventive article may comprise a combination of two or more embodiments as described herein.

An inventive film may comprise a combination of two or more embodiments as described herein.

Polymerizations

For a high pressure, free radical initiated polymerization process, two basic types of reactors are known. The first type is an agitated autoclave vessel having one or more reaction zones (the autoclave reactor). The second type is a jacketed tube which has one or more reaction zones (the tubular reactor). The pressure in each autoclave and tubular reactor zone of the process is typically from 100 to 400, more typically from 120 to 360, and even more typically from 150 to 320 MPa. The polymerization temperature in each tubular reactor zone of the process is typically from 100 to 400, more typically from 130 to 360, and even more typically from 140 to 330° C.

The polymerization temperature in each autoclave reactor zone of the process is typically from 150 to 300, more typically from 165 to 290, and even more typically from 180 to 280° C.

The first ethylene-based polymers with broad MWD are typically made at polymerization conditions comprising one or more of the following process elements:

Reduced operating pressure (versus maximum operating pressure of reactor system);

Elevated polymerization temperatures: one or more autoclave zone and/or one or more tubular reactor zone are operated at a control or maximum peak temperature exceeding respectively 240 and 290° C.;

Minimal three reaction zones of autoclave and/or tubular nature;

Selection of type and/or distribution of CTA over the reaction zones to ensure broad MWD product; and/or Optional use of a bifunctional coupling and/or branching agent.

The high pressure process of the present invention, to produce polyethylene homopolymers or ethylene-based interpolymers having the advantageous properties as found in accordance with the invention, is preferably carried out in a tubular reactor having at least three reaction zones.

Initiators

The process of the present invention is a free radical polymerization process. The type of free radical initiator to be used in the present process is not critical, but preferably one of the initiators applied, should allow high temperature operation in the range from 300° C. to 350° C. Free radical initiators that are generally used include organic peroxides, such as peresters, perketals, peroxy ketones, percarbonates, and cyclic multifunctional peroxides. These organic peroxy initiators are used in conventional amounts, typically from 0.005 to 0.2 wt % based on the weight of polymerizable monomers. Other suitable initiators include azodicarboxylic esters, azodicarboxylic dinitriles and 1,1,2,2-tetramethylethane derivatives, and other components capable of forming free radicals in the desired operating temperature range.

Peroxides are typically injected as diluted solutions in a suitable solvent, for example, in a hydrocarbon solvent. In one embodiment, an initiator is added to at least one reaction zone of the polymerization, and wherein the initiator has a "half-life temperature at one second" greater than 255° C., preferably greater than 260° C. In a further embodiment, such initiators are used at a peak polymerization temperature from 320° C. to 350° C. In a further embodiment, the initiator comprises at least one peroxide group incorporated in a ring structure.

Examples of such initiators include, but are not limited to, TRIGONOX 301 (3,6,9-triethyl-3,6,9-trimethyl-1,4,7-triperoxonaan) and TRIGONOX 311 (3,3,5,7,7-pentamethyl-1,2,4-trioxepane), both available from Akzo Nobel, and HMCH-4-AL (3,3,6,6,9,9-hexamethyl-1,2,4,5-tetroxonane) available from United Initiators. See also International Publication Nos. WO 02/14379 and WO 01/68723.

Chain Transfer Agents (CTA)

Chain transfer agents or telogens are used to control the melt index in a polymerization process. Chain transfer involves the termination of growing polymer chains, thus limiting the ultimate molecular weight of the polymer material. Chain transfer agents are typically hydrogen atom donors that will react with a growing polymer chain and stop the polymerization reaction of the chain. These agents can be of many different types, from saturated hydrocarbons or unsaturated hydrocarbons to aldehydes, ketones or alcohols. By controlling the concentration of the selected chain transfer agent, one can control the length of polymer chains, and, hence the molecular weight, for example, the number average molecular weight, Mn. The melt flow index (MFI or $I_2$) of a polymer, which is related to Mn, is controlled in the same way.

The chain transfer agents used in the process of this invention include, but are not limited to, aliphatic and olefinic hydrocarbons, such as pentane, hexane, cyclohexane, propene, pentene or hexane; ketones such as acetone, diethyl ketone or diamyl ketone; aldehydes such as formaldehyde or acetaldehyde; and saturated aliphatic aldehyde alcohols such as methanol, ethanol, propanol or butanol. The chain transfer agent may also be a monomeric chain transfer agent. For example, see WO 2012/057975, WO2013/095969, and WO2014/003837.

Differentiated CTA concentrations in the reaction zones can be used to achieve and to control the desired molecular weight distribution. Means to differentiate the CTA concentration in reaction zones include among others methods described in WO2013/059042, WO2011/075465 and WO2012/044504.

A further way to influence the melt index includes the build up and control, in the ethylene recycle streams, of incoming ethylene impurities, like methane and ethane, peroxide dissociation products, like tert-butanol, acetone, etc., and/or solvent components used to dilute the initiators. These ethylene impurities, peroxide dissociation products, and/or dilution solvent components can act as chain transfer agents.

Monomer and Comonomers

The term ethylene interpolymer as used in the present description and the claims refer to polymers of ethylene and one or more comonomers. Suitable comonomers to be used in the ethylene polymers of the present invention include, but are not limited to, ethylenically unsaturated monomers and especially $C_{3-20}$ alpha-olefins, carbon monoxide, vinyl acetate, alkyl acrylates, or a bifunctional or higher functional comonomer (includes monomers with two or more monomeric groups). Typically comonomers can also act as chain transfer agents to some degree. Those comonomers with high chain transfer activity are designated as monomeric CTAs.

Additives

An inventive composition may comprise one or more additives. Suitable additives include stabilizers; fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers, oil extenders, including paraffinic or napthelenic oils. An inventive composition may comprise other polymer types.

Applications

The polymers of this invention may be employed in a variety of conventional thermoplastic fabrication processes to produce useful articles, including, but not limited to, monolayer and multilayer films; molded articles, such as blow molded, injection molded, or rotomolded articles; coatings; fibers; and woven or non-woven fabrics.

An inventive polymer may be used in a variety of films, including but not limited to, extrusion coating, food packaging, consumer, industrial, agricultural (applications or films), lamination films, fresh cut produce films, meat films, cheese films, candy films, clarity shrink films, collation shrink films, stretch films, silage films, greenhouse films, fumigation films, liner films, stretch hood, heavy duty shipping sacks, pet food, sandwich bags, sealants, and diaper backsheets.

An inventive polymer is also useful in other direct end-use applications. An inventive polymer may be used for wire and cable coating operations, in sheet extrusion for vacuum forming operations, and forming molded articles, including the use of injection molding, blow molding process, or rotomolding processes.

Other suitable applications for the inventive polymers include elastic films and fibers; soft touch goods, such as appliance handles; gaskets and profiles; auto interior parts and profiles; foam goods (both open and closed cell); impact modifiers for other thermoplastic polymers, such as high density polyethylene, or other olefin polymers; cap liners; and flooring.

Definitions

Unless stated to the contrary, implicit from the context, or customary in the art, all parts and percents are based on weight and all test methods are current as of the filing date of this disclosure.

The term "composition," as used herein, refers to a mixture of materials which comprise the composition, as well as reaction products and decomposition products formed from the materials of the composition.

The terms "blend" or "polymer blend," as used, mean an intimate physical mixture (that is, without reaction) of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor, or forming one polymer in the presence of another polymer).

The term "polymer" refers to a compound prepared by polymerizing monomers, whether of the same or a different type. The generic term polymer thus embraces the term homopolymer (which refers to polymers prepared from only one type of monomer with the understanding that trace amounts of impurities can be incorporated into the polymer structure), and the term "interpolymer" as defined infra. Trace amounts of impurities may be incorporated into and/or within a polymer.

The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" or "ethylene polymer" refers to a polymer that comprises a majority amount of polymerized ethylene, based on the weight of the polymer and, optionally, may comprise at least one comonomer.

The term "ethylene-based interpolymer" or "ethylene interpolymer" refers to an interpolymer that comprises a majority amount of polymerized ethylene, based on the weight of the interpolymer, and comprises at least one comonomer.

The term "ethylene-based copolymer" or "ethylene copolymer" refers to a copolymer that comprises a majority amount of polymerized ethylene based on the weight of the copolymer, and only one comonomer (thus, only two monomer types).

The terms "autoclave-based products" or "autoclaved-based polymers," as used herein, refer to polymers prepared in a reactor system comprising at least one autoclave reactor.

The phrase "high pressure, free-radical polymerization process," as used herein, refers to a free radical initiated polymerization, carried out at an elevated pressure of at least 1000 bar (100 MPa).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Density: Samples for density measurement are prepared according to ASTM D 1928. Polymer samples are pressed at 190° C. and 30,000 psi (207 MPa) for three minutes, and then at 21° C. and 207 MPa for one minute. Measurements are made within one hour of sample pressing using ASTM D792, Method B.

Melt Index: Melt index, or $I_2$ (or I2), (grams/10 minutes or dg/min) is measured in accordance with ASTM D 1238, Condition 190° C./2.16 kg. $I_{10}$ is measured with ASTM D 1238, Condition 190° C./10 kg.

Triple Detector Gel Permeation Chromatography (TDGPC): High temperature 3Det-GPC analysis is performed on an ALLIANCE GPCV2000 instrument (Waters Corp.) set at 145° C. The flow rate for the GPC is 1 mL/min. The injection volume is 218.5 µL. The column set consists of four Mixed-A columns (20-µm particles; 7.5×300 mm; Polymer Laboratories Ltd).

Detection is achieved by using an IR4 detector from PolymerChAR, equipped with a CH-sensor; a Wyatt Technology Dawn DSP MALS detector (Wyatt Technology Corp., Santa Barbara, Calif., USA), equipped with a 30-mW argon-ion laser operating at λ=488 nm; and a Waters three-capillary viscosity detector. The MALS detector is calibrated by measuring the scattering intensity of the TCB solvent. Normalization of the photodiodes is done by injecting SRM 1483, a high density polyethylene with weight-average molecular weight (Mw) of 32,100 g/mol and poly-dispersity (MWD) of 1.11. A specific refractive index increment (dn/dc) of −0.104 mL/mg, for polyethylene in TCB, is used.

The conventional GPC calibration is done with 20 narrow PS standards (Polymer Laboratories Ltd.) with molecular weights in the range from 580 to 7,500,000 g/mol. The polystyrene standard peak molecular weights are converted to polyethylene molecular weights using the following equation:

$$M_{polyethylene} = A \times (M_{polystyrene})^B,$$

with A=0.39, B=1. The value of A is determined by using a linear high density polyethylene homopolymer (HDPE) with Mw of 115,000 g/mol. The HDPE reference material is also used to calibrate the IR detector and viscometer by assuming 100% mass recovery and an intrinsic viscosity of 1.873 dL/g.

The column calibration curve was obtained by fitting a first order polynomial to the respective polyethylene-equivalent calibration points obtained from the above equation to the observed elution volumes.

Number, weight, and z-average molecular weights (GPC) were calculated according to the following equations:

$$\overline{Mn} = \frac{\sum_i Wf_i}{\sum_i (Wf_i / M_i)},$$

$$\overline{Mw} = \frac{\sum_i (Wf_i * M_i)}{\sum_i Wf_i},$$

$$\overline{Mz} = \frac{\sum_i (Wf_i * M_i^2)}{\sum_i (Wf_i * M_i)},$$

where, $Wf_i$ is the weight fraction of the i-th component and $M_i$ is the molecular weight of the i-th component. The molecular weight distribution (MWD) was expressed as the ratio of the weight average molecular weight (Mw) to the number average molecular weight (Mn).

Distilled "Baker Analyzed" grade 1,2,4-trichlorobenzene (J.T. Baker, Deventer, The Netherlands), containing 200 ppm of 2,6-di-tert-butyl-4-methylphenol (Merck, Hohenbrunn, Germany), is used as the solvent for sample preparation, as well as for the 3Det-GPC experiment. HDPE SRM 1483 is obtained from the U.S. National Institute of Standards and Technology (Gaithersburg, Md., USA).

LDPE solutions are prepared by dissolving the samples, under gentle stirring, for three hours at 160° C. The PS standards are dissolved under the same conditions for 30 minutes. The sample concentration for the 3Det-GPC experiment is 1.5 mg/mL, and the polystyrene concentrations are 0.2 mg/mL.

A MALS detector measures the scattered signal from polymers or particles in a sample under different scattering angles θ. The basic light scattering equation (from M. Anderson, B. Wittgren, K.-G. Wahlund, Anal. Chem. 75, 4279 (2003)) can be written as follows:

$$\sqrt{\frac{Kc}{R_\theta}} = \sqrt{\frac{1}{M} + \frac{16\pi^2}{3\lambda^2} \frac{1}{M} Rg^2 \sin^2\left(\frac{\theta}{2}\right)},$$

where $R_\theta$ is the excess Rayleigh ratio, K is an optical constant, which is, among other things, dependent on the specific refractive index increment (dn/dc), c is the concentration of the solute, M is the molecular weight, $R_g$ is the radius of gyration, and λ is the wavelength of the incident light. Calculation of the molecular weight and radius of gyration from the light scattering data require extrapolation to zero angle (see also P. J. Wyatt, Anal. Chim. Acta 272, 1 (1993)). This is done by plotting $(Kc/R_\theta)^{1/2}$ as a function of $\sin^2(\theta/2)$ in the so-called Debye plot. The molecular weight can be calculated from the intercept with the ordinate, and the radius of gyration from the initial slope of the curve. The second virial coefficient is assumed to be negligible. The intrinsic viscosity numbers are calculated from both the viscosity and concentration detector signals by taking the ratio of the specific viscosity and the concentration at each elution slice.

ASTRA 4.72 (Wyatt Technology Corp.) software is used to collect the signals from the IR detector, the viscometer, and the MALS detector, and to run the calculations.

The calculated molecular weights, e.g. Mw(abs), and molecular weight distributions (e.g., Mw(abs)/Mn(abs)) are obtained using a light scattering constant derived from one or more of the polyethylene standards mentioned and a refractive index concentration coefficient, dn/dc, of 0.104. Generally, the mass detector response and the light scattering constant should be determined from a linear standard with a molecular weight in excess of about 50,000 Daltons. The viscometer calibration can be accomplished using the methods described by the manufacturer, or alternatively, by using the published values of suitable linear standards such as Standard Reference Materials (SRM) 1475a, 1482a, 1483, or 1484a. The chromatographic concentrations are assumed low enough to eliminate addressing $2^{nd}$ virial coefficient effects (concentration effects on molecular weight).

The obtained MWD(abs) curve from TD-GPC is summarized with three characteristic parameters: Mw(abs), Mn(abs), and w, where w is defined as "weight fraction of molecular weight greater than $10^6$ g/mole, based on the total weight of polymer, and as determined by GPC(abs)."

In equation form, the parameters are determined as follows. Numerical integration from the table of "log M" and "dw/d log M" is typically done with the trapezoidal rule:

$$Mw(\text{abs}) = \int_{-\infty}^{\infty} M \frac{dw}{d\log M} d\log M,$$

$$Mn(\text{abs}) = \frac{1}{\int_{-\infty}^{\infty} \frac{1}{M} \frac{dw}{d\log M} d\log M},$$

and $$w = \int_{6}^{\infty} M \frac{dw}{d\log M} d\log M.$$

Rheological G'

The sample used in the G' measurement was prepared from a compression molding plaque. A piece of aluminum foil was placed on a backplate, and a template or mold was placed on top of the backplate. Approximately 12 grams of resin was placed in the mold, and a second piece of aluminum foil was placed over the resin and mold. A second backplate was then placed on top of the aluminum foil. The total ensemble was put into a compression molding press, which was run at the following conditions: 3 min at 150° C., at 10 bar pressure, followed by 1 min at 150° C., at 150 bar, followed by a "1.5 min" quench cooling to room temperature, at 150 bar. A 25 mm disk was stamped out of the compression-molded plaque. The thickness of this disk was approximately 2.0 mm.

The rheology measurement to determine G' was done in a nitrogen environment, at 170° C., and a strain of 10%. The stamped-out disk was placed between the two "25 mm" parallel plates located in an ARES-1 (Rheometrics SC) rheometer oven, which was preheated, for at least 30 minutes, at 170° C., and the gap of the "25 mm" parallel plates was slowly reduced to 1.65 mm. The sample was then allowed to remain for exactly 5 minutes at these conditions. The oven was then opened, the excess sample was carefully trimmed around the edge of the plates, and the oven was closed. The storage modulus and loss modulus of the sample were measured via a small amplitude, oscillatory shear, according to a decreasing frequency sweep from 100 to 0.1 rad/s (when able to obtain a G" value lower than 500 Pa at 0.1 rad/s), or from 100 to 0.01 rad/s. For each frequency sweep, 10 points (logarithmically spaced) per frequency decade were used.

The data were plotted (G' (Y-axis) versus G" (X-axis)) on a log-log scale. The Y-axis scale covered the range from 10 to 1000 Pa, while the X-axis scale covered the range from 100 to 1000 Pa. The Orchestrator software was used to select the data in the region where G" was between 200 and 800 Pa (or using at least 4 data points). The data were fit to a log polynomial model using the fit equation Y=C1+C2 ln(x). Using the Orchestrator software, G' at G" equal to 500 Pa was determined by interpolation.

In some cases, the G' (at a G" of 500 Pa) was determined from test temperatures of 150° C. and 190° C. The value at 170° C. was calculated from a linear interpolation from the values at these two temperatures.

Melt Strength

Melt strength measurements are conducted on a Göettfert Rheotens 71.97 (Göettfert Inc.; Rock Hill, S.C.) attached to a Göettfert Rheotester 2000 capillary rheometer. A polymer melt is extruded through a capillary die with a flat entrance angle (180 degrees) with a capillary diameter of 2.0 mm and an aspect ratio (capillary length/capillary diameter) of 15.

After equilibrating the samples at 190° C. for 10 minutes, the piston is run at a constant piston speed of 0.265 mm/second. The standard test temperature is 190° C. The sample is drawn uniaxially to a set of accelerating nips located 100 mm below the die with an acceleration of 2.4 mm/second$^2$. The tensile force is recorded as a function of the take-up speed of the nip rolls. Melt strength is reported as the plateau force (cN) before the strand broke. The following conditions are used in the melt strength measurements: plunger speed=0.265 mm/second; wheel acceleration=2.4 mm/s$^2$; capillary diameter=2.0 mm; capillary length=30 mm; and barrel diameter=12 mm.

Nuclear Magnetic Resonance ($^{13}$C NMR)

Samples were prepared by adding approximately "3 g of a 50/50 mixture of tetrachloroethane-d2/orthodichlorobenzene, containing 0.025 M Cr(AcAc)$_3$," to a "0.25 to 0.40 g polymer sample," in a 10 mm NMR tube. Oxygen was removed from the sample by placing the open tubes in a nitrogen environment for at least 45 minutes. The samples were then dissolved and homogenized by heating the tube, and its contents to 150° C., using a heating block and heat gun. Each dissolved sample was visually inspected to ensure homogeneity. Samples were thoroughly mixed, immediately prior to analysis, and were not allowed to cool before insertion into the heated NMR sample holders.

All data were collected using a Bruker 400 MHz spectrometer. The data was acquired using a six second pulse repetition delay, 90-degree flip angles, and inverse gated decoupling, with a sample temperature of 125° C. All measurements were made on non-spinning samples in locked mode. Samples were allowed to thermally equilibrate for seven minutes prior to data acquisition. The $^{13}$C NMR chemical shifts were internally referenced to the EEE triad at 30.0 ppm. The C6+ value was a direct measure of C6+ branches in LDPE, where the long branches were not distinguished from chain ends. The 32.2 ppm peak, representing the third carbon from the end of all chains or branches of six or more carbons, was used to determine C6+ value.

Nuclear Magnetic Resonance ($^1$H NMR)

Sample Preparation

The samples were prepared by adding approximately 130 mg of sample to "3.25 g of 50/50, by weight, tetrachlorethane-d2/perchloroethylene" with 0.001 M Cr(AcAc)$_3$ in a NORELL 1001-7, 10 mm NMR tube. The samples were purged by bubbling N2 through the solvent, via a pipette inserted into the tube, for approximately five minutes, to prevent oxidation. Each tube was capped, sealed with TEF-LON tape, and then soaked at room temperature, overnight, to facilitate sample dissolution. The samples were kept in a N2 purge box, during storage, before, and after preparation, to minimize exposure to O2. The samples were heated and vortexed at 115° C. to ensure homogeneity.

Data Acquisition Parameters

The 1H NMR was performed on a Bruker AVANCE 400 MHz spectrometer, equipped with a Bruker Dual DUL high-temperature CryoProbe, and a sample temperature of 120° C. Two experiments were run to obtain spectra, a control spectrum to quantitate the total polymer protons, and a double presaturation experiment, which suppressed the intense polymer backbone peaks, and enabled high sensitivity spectra for quantitation of the end-groups. The control was run with ZG pulse, 4 scans, SWH 10,000 Hz, AQ 1.64s, D1 14s. The double presaturation experiment was run with a modified pulse sequence, TD 32768, 100 scans, DS 4, SWH 10,000 Hz, AQ 1.64s, D1 1s, D13 13s.

Data Analysis—1H NMR Calculations

The signal from residual 1H in TCE-d2 (at 6.0 ppm) was integrated, and set to a value of 100, and the integral from 3 to −0.5 ppm was used as the signal from the whole polymer in the control experiment. For the presaturation experiment, the TCE signal was also set to 100, and the corresponding integrals for unsaturation (vinylene at about 5.40 to 5.60 ppm, trisubstituted at about 5.16 to 5.35 ppm, vinyl at about 4.95 to 5.15 ppm, and vinylidene at about 4.70 to 4.90 ppm) were obtained.

In the presaturation experiment spectrum, the regions for cis- and trans-vinylene, trisubstituted, vinyl, and vinylidene were integrated. The integral of the whole polymer from the control experiment was divided by two to obtain a value representing X thousands of carbons (i.e., if the polymer integral=28000, this represents 14,000 carbons, and X=14).

The unsaturated group integrals, divided by the corresponding number of protons contributing to that integral, represent the moles of each type of unsaturation per X thousand carbons. Dividing the moles of each type of unsaturation by X, then gives moles unsaturated groups per 1000 moles of carbons.

Film Testing

The following physical properties were measured on the films as described in the experimental section. Film thickness was measured using a Measuretech instrument.

Total (Overall) Haze and Internal Haze: Internal haze and total haze were measured according to ASTM D 1003-07. Internal haze was obtained via refractive index matching using mineral oil (1-2 teaspoons), which was applied as a coating on each surface of the film. A Hazegard Plus (BYK-Gardner USA; Columbia, Md.) was used for testing. For each test, five samples were examined, and an average reported. Sample dimensions were "6 in×6 in."

45° Gloss: ASTM D2457-08 (average of five film samples; each sample "10 in×10 in").

Clarity: ASTM D1746-09 (average of five film samples; each sample "10 in×10 in").

2% Secant Modulus—MD (machine direction) and CD (cross direction): ASTM D882-10 (average of five film samples in each direction; each sample "1 in×6 in").

MD and CD Elmendorf Tear Strength: ASTM D1922-09 (average of 15 film samples in each direction; each sample "3 in×2.5 in" half moon shape).

MD and CD Tensile Strength: ASTM D882-10 (average of five film samples in each direction; each sample "1 in×6 in").

Dart Impact Strength: ASTM D1709-09 (minimum of 20 drops to achieve a 50% failure; typically ten "10 in×36 in" strips).

Puncture Strength: Puncture was measured on an INSTRON Model 4201 with SINTECH TESTWORKS SOFTWARE Version 3.10. The specimen size was "6 in×6 in," and four measurements were made to determine an average puncture value. The film was conditioned for 40 hours after film production, and at least 24 hours in an ASTM controlled laboratory (23° C. and 50% relative humidity). A "100 lb" load cell was used with a round specimen holder of 4 inch diameter. The puncture probe is a "½ inch diameter" polished stainless steel ball (on a 2.5" rod) with a "7.5 inch maximum travel length."

There was no gauge length, and the probe was as close as possible to, but not touching, the specimen. The probe was set by raising the probe until it touched the specimen. Then the probe was gradually lowered, until it was not touching the specimen. Then the crosshead was set at zero. Considering the maximum travel distance, the distance would be approximately 0.10 inch. The crosshead speed was 10 inches/minute. The thickness was measured in the middle of the specimen. The thickness of the film, the distance the crosshead traveled, and the peak load were used to determine the puncture by the software. The puncture probe was cleaned using a "KIM-WIPE" after each specimen.

Shrink Tension: Shrink tension was measured according to the method described in Y. Jin, T. Hermel-Davidock, T. Karjala, M. Demirors, J. Wang, E. Leyva, and D. Allen, "Shrink Force Measurement of Low Shrink Force Films", SPE ANTEC Proceedings, p. 1264 (2008). The shrink tension of film samples was measured through a temperature ramp test that was conducted on an RSA-III Dynamic Mechanical Analyzer (TA Instruments; New Castle, Del.) with a film fixture. Film specimens of "12.7 mm wide" and "63.5 mm long" were die cut from the film sample, either in the machine direction (MD) or the cross direction (CD), for testing. The film thickness was measured by a Mitutoyo Absolute digimatic indicator (Model C112CEXB). This indicator had a maximum measurement range of 12.7 mm, with a resolution of 0.001 mm. The average of three thickness measurements, at different locations on each film specimen, and the width of the specimen, were used to calculate the film's cross sectional area (A), in which "A=Width×Thickness" of the film specimen that was used in shrink film testing. A standard film tension fixture from TA Instruments was used for the measurement. The oven of the RSA-III was equilibrated at 25° C., for at least 30 minutes, prior to zeroing the gap and the axial force. The initial gap was set to 20 mm. The film specimen was then attached onto both the upper and the lower fixtures. Typically, measurements for MD only require one ply film. Because the shrink tension in the CD direction is typically low, two or four plies of films are stacked together for each measurement to improve the signal-to-noise ratio. In such a case, the film thickness is the sum of all of the plies. In this work, a single ply was used in the MD direction and two plies were used in the CD direction. After the film reached the initial temperature of 25° C., the upper fixture was manually raised or lowered slightly to obtain an axial force of −1.0 g. This was to ensure that no buckling or excessive stretching of the film occurred at the beginning of the test. Then the test was started. A constant fixture gap was maintained during the entire measurement.

The temperature ramp started at a rate of 90° C./min, from 25° C. to 80° C., followed by a rate of 20° C./min, from 80° C. to 160° C. During the ramp from 80° C. to 160° C., as the film shrunk, the shrink force, measured by the force transducer, was recorded as a function of temperature for further analysis. The difference between the "peak force" and the "baseline value before the onset of the shrink force peak" is considered the shrink force (F) of the film. The shrink tension of the film is the ratio of the shrink force (F) to the initial cross sectional area (A) of the film.

For the MD Shrink Tension, three film samples were tested, and an average reported.

For the CD Shrink Tension, three film samples were tested, and an average reported.

EXPERIMENTAL

First Ethylene-based Polymers

Example IE1

The polymerization was carried out in tubular reactor with three reaction zones. In each reaction zone, pressurized water was used for cooling and/or heating the reaction medium, by circulating this water through the jacket of the reactor. The inlet-pressure was 2100 bar, and the pressure drop over the whole tubular reactor system was about 300 bars. Each reaction zone had one inlet and one outlet. Each inlet stream consisted of the outlet stream from the previous reaction zone and/or an added ethylene-rich feed stream. The ethylene was supplied according to a specification, which allowed a trace amount (maximum of 5 mol ppm) of acetylene in the ethylene. The non-converted ethylene, and other gaseous components in the reactor outlet, were recycled through a high pressure and a low pressure recycle system, and were compressed and distributed through a booster, a primary, and a hyper (secondary) compressor system, according flow scheme shown in FIG. 1. Organic peroxides were fed into each reaction zone (see Table 1). Acetone was used as a chain transfer agent, and it was present in each reaction zone inlet originating from the low pressure and high pressure recycle flows (13 and 15), as well as from freshly injected CTA make-up stream 7 and/or stream 6. The polymer was made at a melt index of 2.0 g/10 min.

After reaching the first peak temperature (maximum temperature) in reaction zone 1, the reaction medium was cooled with the help of the pressurized water. At the outlet of reaction zone 1, the reaction medium was further cooled by injecting a fresh, cold, ethylene-rich feed stream (20), and the reaction was re-initiated by feeding an organic peroxide. This process was repeated at the end of the second reaction zone, to enable further polymerization in the third reaction zone. The polymer was extruded and pelletized (about 30 pellets per gram), using a "single screw" extruder system at a melt temperature around 230-250° C. The weight ratio of the ethylene-rich feed streams (9:20:21) to the three reaction zones was 1.00:0.77:0.23. The R2 and R3 values were each 2.22. The R values are calculated according to International Publication WO 2013/059042 (International Patent Application PCT/US12/059469 filed Oct. 10, 2012). Rn (n=reaction zone number, n>1) is the ratio of "mass fraction of fresh ethylene fed to the first reaction zone (RZ1)" to "mass fraction of fresh ethylene fed to the nth reaction zone (RZn)" is (Rn=RZ1/RZn). The internal process velocity was approximately 12.5, 9 and 11 msec, respectively, for the first, second and third reaction zone. In this inventive example, the weight ratio of the CTA make-up streams 7 and 6 was 1.1. Additional information can be found in Tables 2 and 3.

Example IE2

The polymerization was carried out in tubular reactor with three reaction zones, as discussed above, with the exemption that both discharge streams (2 and 3) of the primary compressor were sent to the reactor front feed stream 5. The weight ratio of the ethylene-rich feed streams (9:20:21) to the three reaction zones was 1.00:0.75:0.25. The polymer was made at a melt index of 1.5 g/10 min. The R2 and R3 values each approached infinity ($\infty$). In this inventive example, the weight ratio of the CTA make-up streams 7 and 6 was 0.09. Additional information can be found in Tables 2 and 3. The CTA was propionaldehyde (PA).

In summary, to achieve tubular resins with high melt strength, suitable as blend component in film compositions, typically together with a low or lower melt strength component, the polymerization conditions need to be selected and balanced; for example, as discussed above Important process parameters include maximum polymerization temperatures, inlet reactor pressure, conversion level, and the type, level and distribution of the chain transfer agent.

TABLE 1

Initiators

| Initiator | Abbreviation |
|---|---|
| tert-Butyl peroxy-2-ethyl hexanoate | TBPO |
| Di-tert-butyl peroxide | DTBP |
| 3,6,9-triethyl 3,6,9-trimethyl 1,4,7-peroxonane | TETMP |

TABLE 2

Pressure and Temperature Conditions (First Ethylene-based Polymers)

| LDPE | Inlet-pressure/ bar | Start-temp./° C. | reinitiation temp. 2nd zone/° C. | reinitiation temp. 3rd zone/° C. | 1st Peak temp./° C. | 2nd Peak temp./° C. | 3rd Peak temp./° C. |
|---|---|---|---|---|---|---|---|
| IE1 | 2100 | 140 | 159 | 241 | 331 | 326 | 311 |
| IE2 | 2100 | 140 | 163 | 248 | 336 | 330 | 309 |

TABLE 3

Additional Information (First Ethylene-based Polymers)

| LDPE | Peroxides | CTA | I2 dg/min$^{-1}$ | R2 and R3 Value* | Ethylene Conversion % |
|---|---|---|---|---|---|
| IE1 | TBPO/DTBP/TETMP | Acetone | 2.0 | 2.16 | 33.4 |
| IE2 | TBPO/DTBP/TETMP | PA | 1.5 | $\infty$ | 32.3 |

Figure 1:
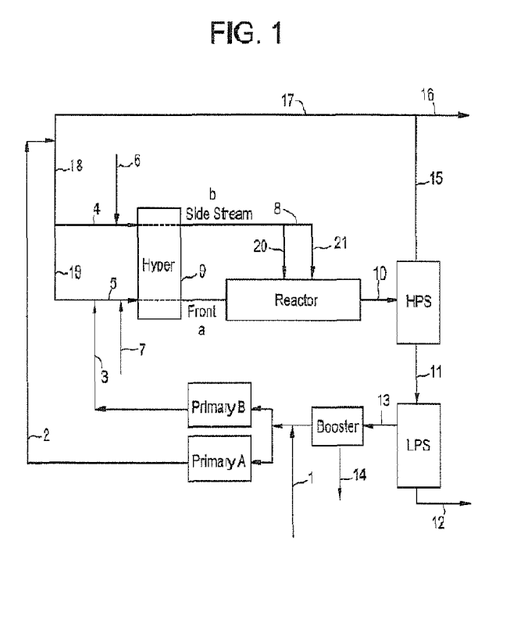
FIG. 1 is a schematic of a polymerization flow scheme.

*When R2 and R3 are 2.16, the flow scheme in FIG. 1 was used. In IE2, both Primary A and B (stream 2 and 3) were sent to stream 4.

Polymer properties are shown in Tables 4 and 5.

TABLE 4

Polymer Properties (LDPEs)

| LDPE | Type* | I2 (dg/min) | Density (g/cc) | Mw(abs) (kg/mol)$^f$ | Mw(abs)/ Mn(abs)$^f$ | Melt Strength (cN) | G' (Pa) At 170° C. | Fraction with MW above 1 × 10$^6$ g/mol$^f$ | Mw(abs)/ Mw(GPC)$^f$ |
|---|---|---|---|---|---|---|---|---|---|
| PG7004** | CE, AC | 4.1 | 0.9215 | 321 | 22.6 | 9.1 | 146 | 0.080 | 2.61 |
| LDPE 770G** | CE, AC | 2.3 | 0.918 | 433 | 26.2 | 14.8 | 183 | 0.106 | 2.99 |
| LD410E** | CE, tub | 2.0 | 0.9242 | 121 | 6.7 | 6.3 | 89$^s$ | 0.009 | 1.50 |
| LD450E** | CE, tub | 2.0 | 0.9231 | 130 | 7.8 | 7.7 | 113$^s$ | 0.014 | 1.52 |
| LDPE 640I** | CE, AC | 2.3 | 0.9191 | 151 | 12.9 | 8.4 | 79 | 0.020 | 1.55 |
| LDPE 621I** | CE, AC | 2.3 | 0.9191 | 511 | 34.2 | 13.3 | 159 | 0.138 | 2.49 |
| AGILITY 1021** | CE, tub | 1.6 | 0.9191 | 190 | 14.4 | 8.1 | 116 | 0.023 | 1.94 |
| AGILITY 1001** | CE, tub | 0.64 | 0.9206 | 204 | 15.6 | 11.3 | 139 | 0.032 | 1.81 |
| IE1 | IE, tub | 2.0 | 0.9193 | 196 | 14.3 | 12.5 | 153 | 0.037 | 1.80 |
| IE2 | IE, tub | 1.5 | 0.9172 | 243 | 17.9 | 19.2 | 179 | 0.057 | 1.82 |

*CE: Comparative Polymer; IE: First Ethylene-based Polymer; AC: Autoclave-based; tub: Tubular.
**Commercial Polymers available from The Dow Chemical Company.
$^s$"170° C. data" is interpolated from 150° C. and 190° C. data.
$^f$All MWD metrics in this table obtained from GPC.

TABLE 5

Polymer Properties (LDPEs)

| LDPE | I2 (dg/min) | Mw (abs) (kg/mol)$^f$ | Melt Strength (cN) | Fraction with M above 1.10$^6$ g/mol$^f$ | A × [(I2)$^B$] (kg/mol)$^a$ | C × [(I2)$^D$] (cN)$^b$ |
|---|---|---|---|---|---|---|
| PG7004 | 4.1 | 321 | 9.1 | 0.080 | 284 | 6.2 |
| 770G | 2.3 | 433 | 14.8 | 0.106 | 358 | 8.5 |
| LD410E | 2.0 | 121 | 6.3 | 0.009 | 379 | 9.2 |
| LD450E | 2.0 | 130 | 7.7 | 0.014 | 379 | 9.2 |
| LDPE 640I | 2.3 | 151 | 8.4 | 0.020 | 358 | 8.5 |
| LDPE 621I | 2.3 | 511 | 13.3 | 0.138 | 358 | 8.5 |
| AGILITY 1021 | 1.6 | 190 | 8.1 | 0.023 | 414 | 10.4 |
| AGILITY 1001 | 0.64 | 204 | 11.3 | 0.032 | 613 | 17.9 |
| IE1 | 2 | 196 | 12.5 | 0.037 | 379 | 9.2 |
| IE2 | 1.5 | 243 | 19.2 | 0.057 | 425 | 10.8 |

$^a$Mw(abs) < A × [(I2)$^B$], where A = 5.00 × 10$^2$ (kg/mole)/(dg/min)$^B$, and B = −0.40 [Mw(abs), GPC].
$^b$MS ≥ C × [(I2)$^D$], where C = 13.5 cN/(dg/min)$^D$, and D = −0.55
Melt Strength = MS, 190° C.].
$^f$All MWD metrics in this table obtained from GPC.

Table 6 contains the branches per 1000 C as measured by $^{13}$C NMR. These LDPE polymers contain amyl, or C5 branches, which are not contained in substantially linear polyethylenes such as AFFINITY Polyolefin Plastomers, or Ziegler-Natta catalyzed LLDPE, such as DOWLEX Polyethylene Resins, both produced by The Dow Chemical Company. Each LDPE (IE1 and IE2) shown in Table 6 contains greater than, or equal to, 2.0 amyl groups (branches) per 1000 carbon atoms. Table 7 contains unsaturation results by $^1$H NMR.

TABLE 6

Branching Results in branches per 1000C by $^{13}$C NMR of Inventive Examples and Comparative Examples

| | C1 | 1,3 diethyl branches | C2 on Quat Carbon | C4 | C5 | C6+ |
|---|---|---|---|---|---|---|
| IE1 | ND | 5.11 | 1.49 | 6.65 | 2.04 | 3.92 |
| IE2 | ND | 5.54 | 2.13 | 7.93 | 2.66 | 4.65 |
| AFFINITY PL 1880 | ND | ND | ND | ND | ND | 19.5* |
| DOWLEX 2045G | ND | ND | ND | ND | ND | 11.4* |

ND = not detected.
*The values in the C6+ column for the DOWLEX and AFFINITY samples represent C6 branches from octene only, and do not include chain ends.

TABLE 7

Unsaturation Results by $^1$H NMR

| | vinyl/ 1000C | cis and trans/ 1000C | trisub/ 1000C | vinylidene/ 1000C | total unsaturation/ 1000C |
|---|---|---|---|---|---|
| IE1 | 0.059 | 0.060 | 0.115 | 0.259 | 0.493 |
| IE2 | 0.068 | 0.057 | 0.136 | 0.295 | 0.554 |
| AFFINITY PL 1880 | 0.040 | 0.064 | 0.123 | 0.043 | 0.270 |
| DOWLEX 2045G | 0.283 | 0.049 | 0.042 | 0.055 | 0.430 |

Formulations

Blown films were made, and physical properties measured, with different LDPEs and one LLDPE, LLDPE1 (DOWLEX 2045G). LLDPE1 had a 1.0 melt index (MI or I2), and a 0.920 g/cc density. Films were made at 10 wt %, 20 wt %, and 80 wt % of the respective LDPE, based on the weight of the LDPE and LLDPE1.

Each formulation was compounded on a MAGUIRE gravimetric blender. A polymer processing aid (PPA), DYNAMAR FX-5920A, was added to each formulation. The PPA was added at 1 wt % of masterbatch, based on the total weight of the formulation. The PPA masterbatch (INGENIA AC-01-01, available from Ingenia Polymers) contained 8 wt % of DYNAMAR FX-5920A in a polyethylene carrier. This amounts to 800 ppm PPA in the polymer.

LLDPE1 was also used as the LLDPE in the films made at maximum output. Maximum output was determined on samples made with 90 wt % DOWLEX 2045G and 10 wt % LDPE, and 80 wt % DOWLEX 2045G and 20 wt % LDPE.

Production of Blown Films

The monolayer blown films were made on an "8 inch die" with a polyethylene "Davis Standard Barrier II screw." External cooling by an air ring and internal bubble cooling were used. General blown film parameters, used to produce each blown film, are shown in Table 8. The temperatures are the temperatures closest to the pellet hopper (Barrel 1), and in increasing order, as the polymer was extruded through the die. The films at the standard rates were run at 250 lb/hr.

TABLE 8

Blown film fabrication conditions for films

| | |
|---|---|
| Blow up ratio (BUR) | 2.5 |
| Nominal Film thickness | 2.0 |
| Die gap (mil) | 70 |
| Air temperature (° F.) | 45 |
| Temperature profile (° F.) | |
| Barrel 1 | 375 |
| Barrel 2 | 420 |
| Barrel 3 | 390 |
| Barrel 4 | 375 |
| Barrel 5 | 375 |
| Screen Temperature | 450 |
| Adapter | 450 |
| Block | 450 |
| Lower Die | 450 |
| Inner Die | 450 |
| Upper Die | 450 |

Production of Films for Determination of Maximum Output Rate of Blown Film

Film samples were made at a controlled rate and at a maximum rate. The controlled rate was 250 lb/hr, which equals a specific output rate of 10.0 lb/hr/inch of die circumference. The die diameter used for the maximum output trials was an 8 inch die, so that for the controlled rate, as an example, the conversion between "lb/hr" and "lb/hr/inch" of die circumference, is shown below. Similarly, such an equation can be used for other rates, such as the maximum rate, by substituting the maximum rate in the equation below to determine the "lb/hr/inch" of die circumference.

Specific Output=(250 Lb/Hr)/(8 inch*$\pi$)=10 Lb/Hr/Inch of Die Circumference

The maximum output rate for a given sample was determined by increasing the output rate to the point where bubble stability was the limiting factor. The extruder profile was maintained for both samples (standard rate and maximum rate), however the melt temperature was higher for the maximum rate samples, due to the increased shear rate with higher motor speed (rpm, revolutions per minute). The bubble stability, at maximum output rate, was determined by taking the bubble to the point where it would not stay seated in the air ring. At that point, the rate was reduced to where the bubble was reseated (maximum output rate) in the air ring, and then a sample was collected. The cooling on the bubble was adjusted by adjusting the air ring and maintaining the bubble. This process determined the maximum output rate, while maintaining bubble stability.

The film results are summarized in Tables 9-13. Table 9 shows film results at standard rate, with Film #1 being 100% LLDPE1, and Films #2-7 being 90% LLDPE1/10% LDPE. Film #2, containing 10% IE2, shows advantages of low total and internal haze, high puncture, high secant modulus, and high MD shrink tension. These properties are important for a variety of films with the desirable properties of good optics, mechanical properties, and shrink properties. This LDPE enables the potential for down-gauging, or lowering of the film thickness, while still retaining good mechanical properties.

Table 10 shows film results at maximum rate, with Film #8 being 100% LLDPE1, and Films #9-14 being 90% LLDPE1/10% LDPE. This table shows a very important advantage of IE2, the improvement in blown film output when added at even low levels (10%) to LLDPE. At 10% LDPE, IE2 has higher blown film output than any of the other LDPEs shown in Table 10, even those with much lower melt index (AGILITY 1001) and autoclave resins of broad molecular weight distribution such as LDPE 6211. The % increase in maximum output over a given LDPE is shown in Table 10 which was calculated as:

% Increase in Output Due to IE2 as Compared to Reference LDPE=(Maximum Output Blend with IE2−Maximum Output Blend with Reference LDPE)×100.

Maximum Output Blend with Reference LDPE

These very substantial differences of 4-11% are novel, and will translate on larger blown film lines to likely even more differentiation and large gains in the speed at which blown films can be produced, leading to cost savings for the producer. Additionally, key film property advantages of good optics, puncture, modulus, and shrink tension are maintained.

Table 11 contains results for 20% LDPE added to LLDPE1 for Films #15-20, at 80% LLDPE1/20% LDPE, made at standard rate, and Table 12 contains results for 20% LDPE added to LLDPE1 for Films 80% LLDPE1/20% LDPE, made at maximum rate. These results show generally good film properties, with particular emphasis on high shrink tension and high blown film rate output. The MD shrink tension of this grade is similar to that of a much lower melt index (0.64) resins (AGILITY 1001), at standard rate, and higher than the other blends with other LDPEs. At maximum output, the shrink tension results are even more differentiated, being much higher than any of the other films. The maximum output in Table 12 is very novel at the 20% LDPE level, being 11-19% higher than those seen for the other LDPEs, including autoclave resins and lower melt index resins. Such large output increases would be highly desirable for converters, allowing much higher production rates.

Table 13 shows the results for LDPE-rich films of 20% LLDPE1/80% LDPE #27-32 made at standard rate. These results show good film properties coupled with very high shrink tension. Although maximum rates were not run for the 20% LLDPE1/80% LDPE films, based on the results at 10% LDPE and 20% LDPE, it is expected that IE2 would also be advantaged in output at this level of LDPE.

Figure 2:
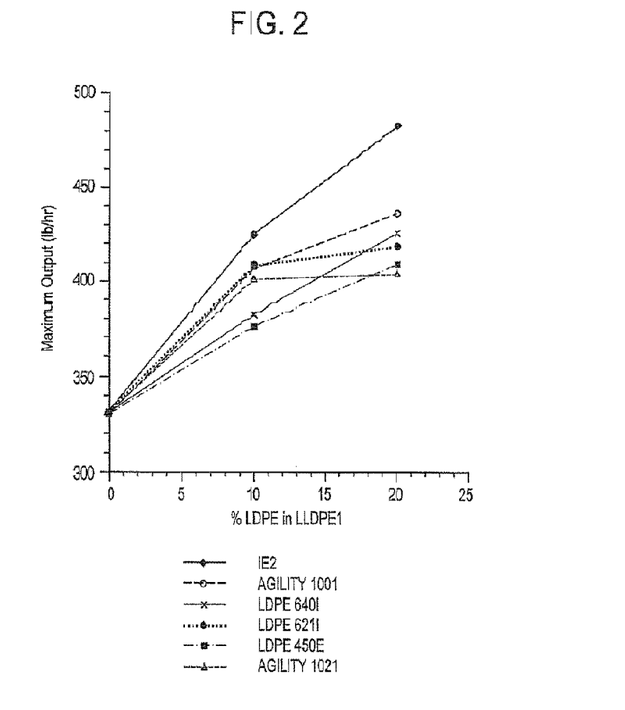
FIG. 2 depicts the maximum output on the blown film line described herein versus the % LDPE in LLDPE1 used in the film.
Figure 3:
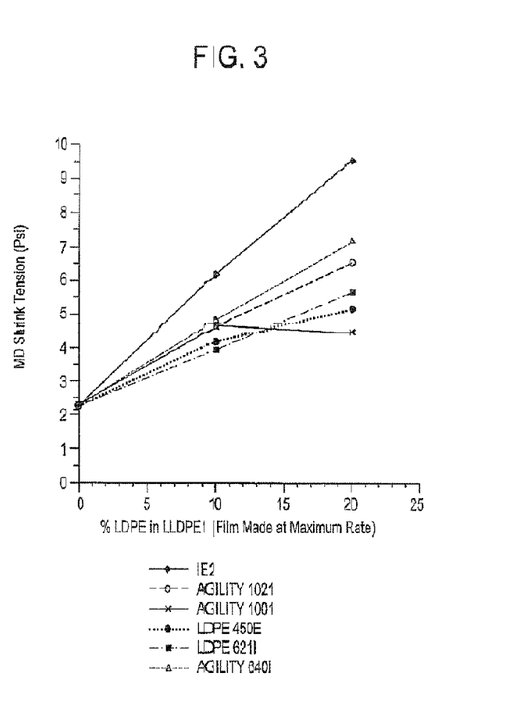
FIG. 3 depicts the MD shrink tension measured on a film made at maximum rate versus the % LDPE in LLDPE1 used in the film.

FIG. 2 shows the maximum output at for the different LDPEs in LLDPE1 at 0%, 10%, and 20% LDPE, and the differentiation and advantage of IE2 as compared to all other LDPEs. FIG. 3 shows the MD shrink tension for films made at maximum output for the different LDPEs in LLDPE1 at 0%, 10%, and 20% LDPE, and the differentiation and advantage of IE2 as compared to all other LDPEs.

TABLE 9

Film properties of 100% LLDPE1; and 90% LLDPE1/10% LDPE Films #1-7 made at 2 mil at a standard (std.) rate of 250 lb/hr (8" die)

| | Film | | | | | | |
|---|---|---|---|---|---|---|---|
| | 1 | 2 | 3 | 4 | 5 | 6 | 7 |
| Component 1 (First Polymer) | — | IE2 | LDPE 621I | AGILITY 1021 | LDPE 640I | LDPE 450E | AGILITY 1001 |
| Wt % Component 1 | — | 10 | 10 | 10 | 10 | 10 | 10 |
| Melt Index Component 1 | — | 1.5 | 2.3 | 1.6 | 2.3 | 1.9 | 0.64 |
| Component 2 (Second Polymer) | LLDPE1 | LLDPE1 | LLDPE1 | LLDPE1 | LLDPE1 | LLDPE1 | LLDPE1 |
| Wt % Component 1 | 100 | 90 | 90 | 90 | 90 | 90 | 90 |
| Blown Film Rate | | Std. | Std. | Std. | Std. | Std. | Std. |
| Haze (%) | 14.6 | 8.4 | 8.7 | 8.4 | 9.5 | 9.4 | 7.7 |
| Haze, Internal (%) | 5.5 | 3.7 | 4.4 | 4.1 | 4.6 | 4.4 | 3.6 |
| 45 Degree Gloss (%) | 49.7 | 67.6 | 70.2 | 69.1 | 66.5 | 66.2 | 70.6 |
| Clarity (%) | 97.9 | 98.2 | 98.4 | 99.4 | 99.0 | 99.3 | 99.3 |
| MD Tear (g) | 876 | 599 | 737 | 675 | 690 | 772 | 678 |
| CD Tear (g) | 943 | 1,074 | 1,175 | 1,244 | 1,188 | 1,300 | 949 |
| Normalized MD Tear (g/mil) | 463 | 310 | 370 | 342 | 360 | 374 | 331 |
| Normalized CD Tear (g/mil) | 479 | 559 | 601 | 646 | 644 | 641 | 489 |
| Dart Drop Impact (g) | 373 | 292 | 319 | 295 | 289 | 304 | 325 |
| Puncture (ft-lbf/in$^3$) | 292 | 256 | 249 | 236 | 253 | 230 | 247 |
| 2% MD Secant Modulus (kpsi) | 32.2 | 33.6 | 32.0 | 31.3 | 31.2 | 32.7 | 32.6 |
| 2% CD Secant Modulus (kpsi) | 36.1 | 36.0 | 37.9 | 35.4 | 34.7 | 34.5 | 34.9 |
| MD Shrink Tension (psi) | 2.68 | 6.76 | 5.27 | 4.62 | 5.49 | 5.35 | 5.01 |
| CD Shrink Tension (psi) | 0.42 | 0.25 | 0.45 | 0.52 | 0.65 | 0.72 | 0.61 |
| Thickness (mil) | 1.93 | 1.93 | 1.87 | 1.89 | 1.82 | 1.88 | 1.95 |
| Frost Line Height (inches) | 39 | 38 | 38 | 38 | 38 | 38 | 38 |
| Melt Temperature (° F.) | 447 | 442 | 442 | 442 | 443 | 444 | 443 |
| Rate Output (lb/hr) | 247 | 251 | 248 | 250 | 249 | 254 | 251 |
| Rate Output (lb/hr/in) | 9.8 | 10.0 | 9.9 | 9.9 | 9.9 | 10.1 | 10.0 |
| Screen Pressure (psi) | 3,290 | 3,420 | 3,260 | 3,290 | 3,330 | 3,410 | 3,410 |

TABLE 10

Film properties of 100% LLDPE1; and 90% LLDPE1/10% LDPE Films #8-14 made at 2 mil at maximum rates (8" die)

| | Film | | | | | | |
|---|---|---|---|---|---|---|---|
| | 8 | 9 | 10 | 11 | 12 | 13 | 14 |
| Component 1 (First Polymer) | — | IE2 | LDPE 621I | AGILITY 1021 | LDPE 640I | LDPE 450E | AGILITY 1001 |
| Wt % Component 1 | — | 10 | 10 | 10 | 10 | 10 | 10 |
| Melt Index Component 1 | — | 1.5 | 2.3 | 1.6 | 2.3 | 1.9 | 0.64 |
| Component 2 (Second Polymer) | LLDPE1 | LLDPE1 | LLDPE1 | LLDPE1 | LLDPE1 | LLDPE1 | LLDPE1 |
| Wt % Component 2 | 100 | 90 | 90 | 90 | 90 | 90 | 90 |
| Blown Film Rate | | Max | Max | Max | Max | Max | Max |
| Haze (%) | 19.5 | 10.0 | 10.9 | 10.7 | 13.7 | 11.0 | 8.6 |
| Haze, Internal (%) | 6.0 | 3.9 | 4.9 | 4.7 | 5.0 | 4.6 | 3.5 |
| 45 Degree Gloss (%) | 37.6 | 60.7 | 61.4 | 61.3 | 50.7 | 60.2 | 66.0 |
| Clarity (%) | 96.6 | 97.9 | 98.3 | 99.1 | 98.3 | 99.1 | 99.2 |
| MD Tear (g) | 956 | 704 | 803 | 817 | 767 | 796 | 796 |
| CD Tear (g) | 999 | 1,222 | 1,280 | 1,405 | 1,315 | 1,064 | 1,059 |
| Normalized MD Tear (g/mil) | 482 | 313 | 387 | 381 | 363 | 385 | 390 |
| Normalized CD Tear (g/mil) | 491 | 547 | 623 | 645 | 630 | 507 | 504 |
| Dart Drop Impact (g) | 370 | 301 | 328 | 346 | 310 | 325 | 292 |
| Puncture (ft-lbf/in$^3$) | 277 | 246 | 237 | 257 | 228 | 234 | 275 |
| 2% MD Secant Modulus (kpsi) | 33.2 | 32.9 | 31.8 | 32.6 | 32.2 | 32.7 | 32.0 |
| 2% CD Secant Modulus (kpsi) | 37.9 | 36.1 | 37.2 | 34.0 | 35.3 | 36.3 | 35.6 |
| MD Shrink Tension (psi) | 2.26 | 6.20 | 4.19 | 4.79 | 4.63 | 3.93 | 4.66 |
| CD Shrink Tension (psi) | 0.67 | 0.40 | 0.73 | 0.69 | 0.57 | 0.50 | 0.42 |
| Thickness (mil) | 2.00 | 1.94 | 1.98 | 2.06 | 1.98 | 2.06 | 1.99 |
| Frost Line Height (inches) | 63 | 82 | 72 | 75 | 72 | 72 | 68 |
| Melt Temperature (° F.) | 457 | 464 | 463 | 461 | 461 | 459 | 463 |
| Rate Output (lb/hr) | 331 | 426 | 409 | 402 | 383 | 377 | 407 |
| % Increase of Maximum Rate IE2 over given LDPE | | | 4 | 6 | 11 | 13 | 5 |

TABLE 10-continued

Film properties of 100% LLDPE1; and 90% LLDPE1/10% LDPE Films #8-14 made at 2 mil at maximum rates (8" die)

| | \multicolumn{7}{c}{Film} | | | | | | |
|---|---|---|---|---|---|---|---|
| | 8 | 9 | 10 | 11 | 12 | 13 | 14 |
| % Increase of Maximum Rate over LLDPE1 | | 29 | 24 | 21 | 16 | 14 | 23 |
| Rate Output (lb/hr/in) | 13.2 | 17.0 | 16.3 | 16.0 | 15.2 | 15.0 | 16.2 |
| Screen Pressure (psi) | 3,920 | 4,250 | 4,260 | 4,160 | 4,010 | 3,900 | 4,270 |

TABLE 11

Film properties of 80% LLDPE1/20% LDPE Films #15-20 made at 2 mil at a standard (std.) rate of 250 lb/hr (8" die)

| | \multicolumn{6}{c}{Film} | | | | | |
|---|---|---|---|---|---|---|
| | 15 | 16 | 17 | 18 | 19 | 20 |
| Component 1 (First Polymer) | IE2 | LDPE 621I | AGILITY 1021 | LDPE 640I | LDPE 450E | AGILITY 1001 |
| Wt % Component 1 | 20 | 20 | 20 | 20 | 20 | 20 |
| Melt Index Component 1 | 1.5 | 2.3 | 1.6 | 2.3 | 1.9 | 0.64 |
| Component 2 (Second Polymer) | LLDPE1 | LLDPE1 | LLDPE1 | LLDPE1 | LLDPE1 | LLDPE1 |
| Wt % Component 2 | 80 | 80 | 80 | 80 | 80 | 80 |
| Blown Film Rate | Std. | Std. | Std. | Std. | Std. | Std. |
| Haze (%) | 8.3 | 8.0 | 7.5 | 7.8 | 7.0 | 6.7 |
| Haze, Internal (%) | 3.5 | 4.1 | 4.3 | 4.6 | 4.0 | 3.2 |
| 45 Degree Gloss (%) | 67.4 | 73.0 | 75.1 | 75.2 | 78.0 | 73.8 |
| Clarity (%) | 95.2 | 97.2 | 99.2 | 99.2 | 99.2 | 98.7 |
| MD Tear (g) | 426 | 472 | 462 | 465 | 453 | 393 |
| CD Tear (g) | 1,149 | 1,025 | 1,209 | 1,251 | 1,339 | 1,195 |
| Normalized MD Tear (g/mil) | 213 | 246 | 236 | 236 | 229 | 209 |
| Normalized CD Tear (g/mil) | 566 | 523 | 603 | 631 | 691 | 611 |
| Dart Drop Impact (g) | 220 | 259 | 235 | 253 | 217 | 259 |
| Puncture (ft-lbf/in$^3$) | 205 | 213 | 200 | 218 | 209 | 220 |
| 2% MD Secant Modulus (kpsi) | 27.4 | 28.7 | 29.1 | 27.9 | 28.9 | 28.8 |
| 2% CD Secant Modulus (kpsi) | 31.1 | 31.6 | 30.5 | 31.3 | 31.6 | 32.1 |
| MD Shrink Tension (psi) | 7.91 | 6.32 | 6.35 | 6.37 | 6.50 | 8.64 |
| CD Shrink Tension (psi) | 0.44 | 0.67 | 0.41 | 0.67 | 0.25 | 0.46 |
| Thickness (mil) | 1.99 | 1.89 | 1.90 | 1.91 | 1.93 | 1.89 |
| Frost Line Height (inches) | 38 | 38 | 38 | 38 | 38 | 38 |
| Melt Temperature (° F.) | 443 | 442 | 442 | 443 | 445 | 444 |
| Rate Output (lb/hr) | 252 | 250 | 249 | 252 | 251 | 254 |
| Rate Output (lb/hr/in) | 10.0 | 9.9 | 9.9 | 10.0 | 10.0 | 10.1 |
| Screen Pressure (psi) | 3,410 | 3,230 | 3,250 | 3,380 | 3,190 | 3,440 |

TABLE 12

Film properties of 80% LLDPE1/20% LDPE Films #21-26 made at 2 mil at maximum rates (8" die)

| | \multicolumn{6}{c}{Film} | | | | | |
|---|---|---|---|---|---|---|
| | 21 | 22 | 23 | 24 | 25 | 26 |
| Component 1 (First Polymer) | IE2 | LDPE 621I | AGILITY 1021 | LDPE 640I | LDPE 450E | AGILITY 1001 |
| Wt % Component 1 | 20 | 20 | 20 | 20 | 20 | 20 |
| Melt Index Component 1 | 1.5 | 2.3 | 1.6 | 2.3 | 1.9 | 0.64 |
| Component 2 (Second Polymer) | LLDPE1 | LLDPE1 | LLDPE1 | LLDPE1 | LLDPE1 | LLDPE1 |
| Wt % Component 2 | 80 | 80 | 80 | 80 | 80 | 80 |
| Blown Film Rate | Max | Std. | Std. | Std. | Std. | Std. |
| Haze (%) | 10.9 | 9.2 | 8.0 | 10.5 | 8.2 | 8.8 |
| Haze, Internal (%) | 4.3 | 4.3 | 4.1 | 5.2 | 4.3 | 3.6 |
| 45 Degree Gloss (%) | 57.5 | 67.8 | 71.8 | 64.4 | 71.7 | 65.2 |
| Clarity (%) | 95.4 | 97.0 | 99.0 | 98.8 | 99.2 | 98.4 |
| MD Tear (g) | 504 | 544 | 516 | 524 | 523 | 508 |
| CD Tear (g) | 1,271 | 1,154 | 1,300 | 1,324 | 1,348 | 1,128 |
| Normalized MD Tear (g/mil) | 246 | 260 | 261 | 246 | 253 | 259 |
| Normalized CD Tear (g/mil) | 607 | 552 | 665 | 657 | 674 | 548 |
| Dart Drop Impact (g) | 241 | 247 | 235 | 262 | 235 | 283 |
| Puncture (ft-lbf/in$^3$) | 199 | 209 | 217 | 208 | 212 | 220 |
| 2% MD Secant Modulus (kpsi) | 27.4 | 28.7 | 28.7 | 27.5 | 29.5 | 29.4 |

TABLE 12-continued

Film properties of 80% LLDPE1/20% LDPE Films #21-26 made at 2 mil at maximum rates (8" die)

| | Film | | | | | |
|---|---|---|---|---|---|---|
| | 21 | 22 | 23 | 24 | 25 | 26 |
| 2% CD Secant Modulus (kpsi) | 30.3 | 33.3 | 31.1 | 30.8 | 31.2 | 31.6 |
| MD Shrink Tension (psi) | 9.58 | 5.15 | 7.19 | 4.48 | 5.65 | 6.54 |
| CD Shrink Tension (psi) | 0.51 | 0.62 | 0.54 | 0.67 | 0.46 | 0.47 |
| Thickness (mil) | 1.98 | 2.02 | 2.00 | 1.99 | 2.02 | 2.05 |
| Frost Line Height (inches) | 80 | 78 | 71 | 74 | 73 | 71 |
| Melt Temperature (° F.) | 470 | 463 | 460 | 463 | 461 | 466 |
| Rate Output (lb/hr) | 483 | 420 | 405 | 427 | 410 | 437 |
| % Increase of Maximum Rate IE2 over given LDPE | | 15 | 19 | 13 | 18 | 11 |
| % Increase of Maximum Rate over LLDPE1 | 46 | 27 | 22 | 29 | 24 | 32 |
| Rate Output (lb/hr/in) | 19.2 | 16.7 | 16.1 | 17.0 | 16.3 | 17.4 |
| Screen Pressure (psi) | 4,390 | 4,080 | 4,030 | 4,270 | 3,960 | 4,390 |

TABLE 13

Film properties of 20% LLDPE1/80% LDPE Films #27-32 made at 2 mil at a standard (std.) rate of 250 lb/hr (8" die)

| | Film | | | | | |
|---|---|---|---|---|---|---|
| | 27 | 28 | 29 | 30 | 31 | 32 |
| Component 1 (First Polymer) | IE2 | LDPE 621I | AGILITY 1021 | LDPE 640I | LDPE 450E | AGILITY 1001 |
| Wt % Component 1 | 80 | 80 | 80 | 80 | 80 | 80 |
| Melt Index Component 1 | 1.5 | 2.3 | 1.6 | 2.3 | 1.9 | 0.64 |
| Component 2 (Second Polymer) | LLDPE1 | LLDPE1 | LLDPE1 | LLDPE1 | LLDPE1 | LLDPE1 |
| Wt % Component 2 | 20 | 20 | 20 | 20 | 20 | 20 |
| Blown Film Rate | Std. | Std. | Std. | Std. | Std. | Std. |
| Haze (%) | 12.4 | 13.7 | 7.6 | 6.2 | 7.3 | 8.8 |
| Haze, Internal (%) | 2.4 | 2.8 | 3.4 | 4.5 | 5.0 | 2.6 |
| 45 Degree Gloss (%) | 47.3 | 44.4 | 71.4 | 84.4 | 77.3 | 61.8 |
| Clarity (%) | 80.8 | 82.3 | 94.6 | 97.9 | 97.1 | 91.6 |
| MD Tear (g) | 279 | 168 | 407 | 334 | 444 | 301 |
| CD Tear (g) | 329 | 322 | 482 | 524 | 489 | 439 |
| Normalized MD Tear (g/mil) | 143 | 88 | 215 | 174 | 234 | 160 |
| Normalized CD Tear (g/mil) | 161 | 162 | 248 | 263 | 246 | 223 |
| Dart Drop Impact (g) | 136 | 136 | 121 | 124 | 91 | 193 |
| Puncture (ft-lbf/in$^3$) | 65 | 60 | 73 | 82 | 70 | 81 |
| 2% MD Secant Modulus (kpsi) | 26.3 | 25.3 | 27.1 | 26.5 | 29.4 | 27.6 |
| 2% CD Secant Modulus (kpsi) | 29.8 | 30.1 | 28.3 | 28.9 | 32.6 | 32.1 |
| MD Shrink Tension (psi) | 24.16 | 21.91 | 15.91 | 10.18 | 13.50 | 30.89 |
| CD Shrink Tension (psi) | 0.35 | 0.67 | 0.36 | 0.32 | 0.31 | 0.52 |
| Thickness (mil) | 1.95 | 1.86 | 1.91 | 1.92 | 1.93 | 1.92 |
| Frost Line Height (inches) | 38 | 38 | 38 | 38 | 38 | 38 |
| Melt Temperature (° F.) | 433 | 432 | 432 | 433 | 433 | 438 |
| Rate Output (lb/hr) | 251 | 247 | 250 | 249 | 251 | 251 |
| Rate Output (lb/hr/in) | 10.0 | 9.8 | 9.9 | 9.9 | 10.0 | 10.0 |
| Screen Pressure (psi) | 1,990 | 1,970 | 1,960 | 2,010 | 1,990 | 2,430 |

The invention claimed is:

1. A composition comprising the following:

A) a first ethylene-based polymer, wherein the first ethylene-based polymer is a low density polyethylene (LDPE) formed by a high pressure, free-radical polymerization process, and comprising the following properties:

a) a Mw(abs) versus I2 relationship: Mw(abs)<A×[(I2)$^B$], where A=5.00×10$^2$ (kg/mole)/(dg/min)$^B$, and B=−0.40;

b) a MS (Melt Strength) versus I2 relationship: MS≥C×[(I2)$^D$], where C=13.5cN/(dg/min)$^D$, and D=−0.55; and c) a melt index (I2) from greater than 0.9 to 2.5 g/10 min; and B) a second ethylene-based polymer;

wherein the second ethylene-based polymer has a melt index (I2) from 0.1 to 4.0 g/10min.

2. The composition of claim 1, wherein the first ethylene-based polymer is present in an amount from "greater than zero" to 30 weight percent, based on the sum of the weight of first ethylene-based polymer and the second ethylene-based polymer.

3. The composition of claim 1, wherein the second ethylene-based polymer is an ethylene/α-olefin interpolymer.

4. The composition of claim 3, wherein the ethylene/α-olefin interpolymer is a heterogeneously branched ethylene/α-olefin interpolymer.

5. The composition of claim 1, wherein the first ethylene-based polymer has a Melt Strength (190° C.) from 10 to 20 cN.

6. The composition of claim 1, wherein the first ethylene-based polymer has a storage modulus G' (170° C.) greater than, or equal to, 140 Pa.

7. The composition of claim 1, wherein the first ethylene-based polymer has a density from 0.910 to 0.940 g/cc.

8. The composition of claim 1, wherein the first ethylene-based polymer has a "weight fraction (w) of molecular weight greater than $10^6$ g/mole, based on the total weight of polymer, as determined by GPC(abs)," that meets the following relationship:

$w < E \times [(I2)^F]$, where E =0.110 (dg/min)$^{-F}$, and F=−0.38 (GPC).

9. The composition of claim 1, wherein the first ethylene-based polymer is polymerized in a reactor configuration comprising at least one tubular reactor.

10. The composition of claim 1, wherein when said composition is formed into a film, via blown film process, the maximum output rate is at least 15 percent greater than the maximum output rate of a similar film formed from a similar composition, except the composition contains 100 wt % of the second ethylene-based polymer, based on the sum weight of the first ethylene-based polymer and the second ethylene-based polymer.

11. An article comprising at least one component formed from the composition of claim 1.

12. A film comprising at least one layer formed from the composition of claim 1.

13. The film of claim 12, wherein the film comprises at least two layers.

14. The film of claim 12, wherein the film has a MD shrink tension greater than 5.00 psi.

* * * * *